Aug. 29, 1961 G. WEISS 2,997,869
CATALYTIC HEATING DEVICE
Filed July 27, 1954 2 Sheets-Sheet 1
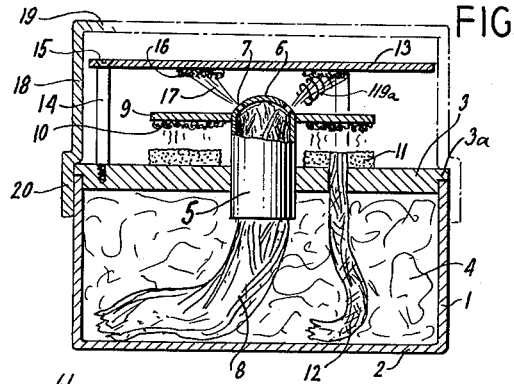
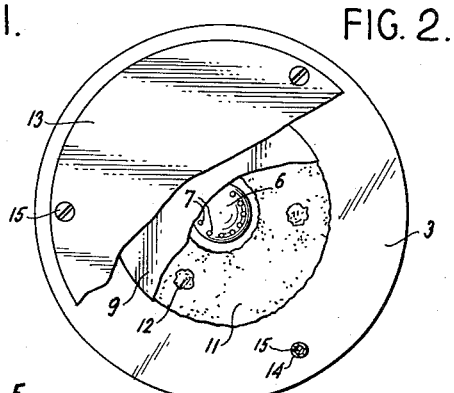
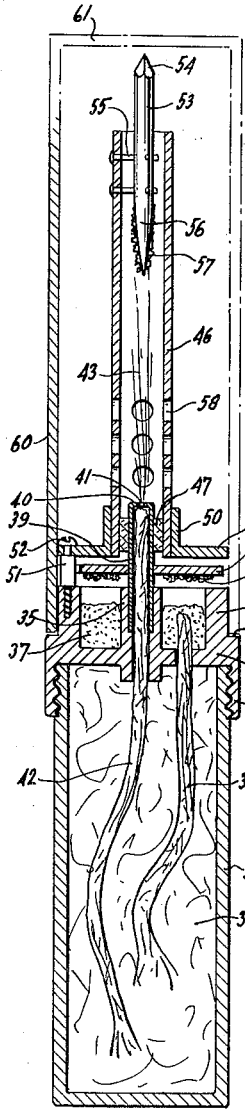
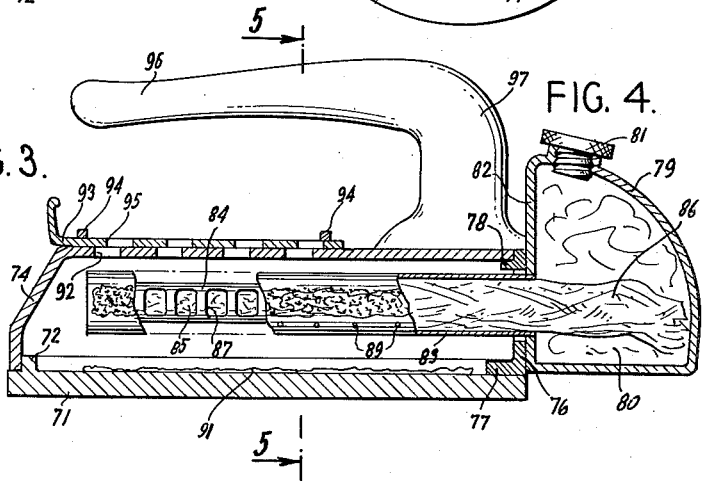
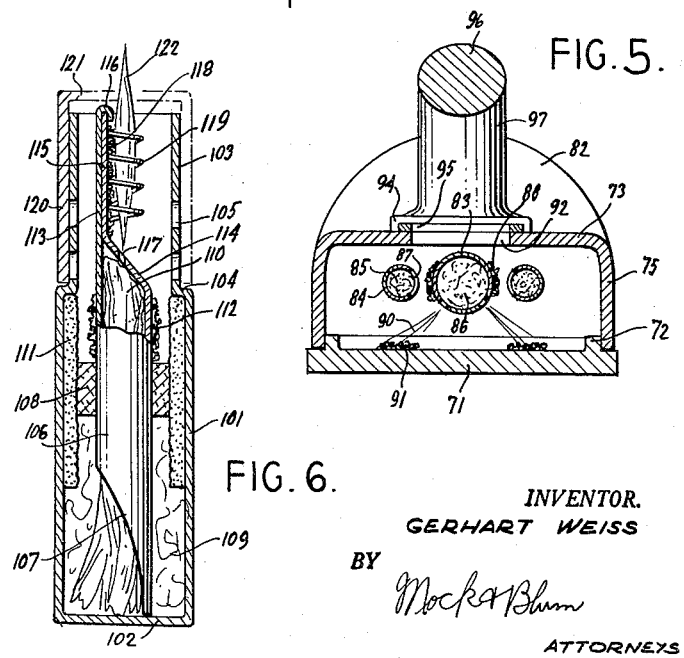
INVENTOR.
GERHART WEISS
BY
*Mock & Blum*
ATTORNEYS

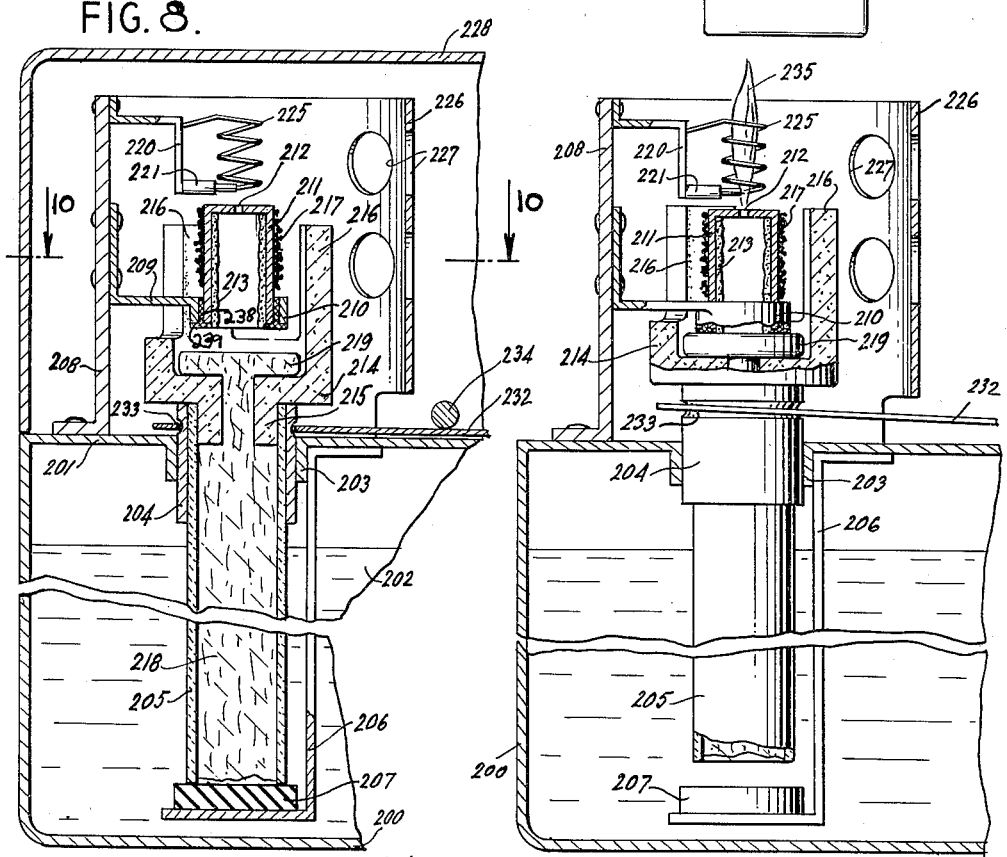

United States Patent Office 2,997,869
Patented Aug. 29, 1961

2,997,869
CATALYTIC HEATING DEVICE
Gerhart Weiss, 66—09 111th St., Forest Hills, N.Y.
Filed July 27, 1954, Ser. No. 446,040
5 Claims. (Cl. 67—7)

This invention relates to improvements in heating devices of the type in which heat is evolved by the combustion of a fuel in the presence of a catalyst.

In preferred embodiments of this invention, I employ methanol as a fuel, and platinum in various forms as a catalyst, the reactions being carried out under normal atmospheric conditions. Of course, it will be apparent that the invention is not limited to this fuel and to this catalyst.

It has been found possible to direct a mixture of methanol vapor and air against a surface upon which a suitable catalyst is deposited, in order to produce a reaction of methanol and oxygen which evolves heat. However, in many applications, in order to carry out the reaction at a temperature which will result in the desired amount of heat liberation, it is necessary to pre-heat the fuel-air mixture.

In accordance with certain preferred embodiments of this invention, I provide a fuel tube having a wick therein which is immersed in liquid methanol and which has suitable outlet openings through which streams of methanol vapor may pass. I coat the surface of this tube, or else a metal surface in close proximity to this tube, with a suitable catalyst. In certain embodiments, this catalyst is in the form of carrier particles such as particles of aluminum oxide, coated with finely divided platinum black. Said catalyst is located very close to a further wick which is also immersed in the liquid methanol. A further catalyst-bearing surface is so located with respect to the outlet holes of the tube, that the escaping methanol vapor inpinges upon the further catalyst. The whole device may be closed by an air-tight cover or the like.

When the cover is removed, the first-mentioned catalyst causes a reaction between methanol vapor and oxygen so as to heat the tube, this being a first reaction. As a result of the heating of the tube, methanol in the tube is vaporized, and the vapor is forcibly expelled from the outlet openings, so that the second reaction at the point of the second catalyst is carried out at a higher temperature than the first reaction. In effect, my improved heaters are cascade heaters.

An important feature of the invention is that the first reaction may be carried out at a relatively low temperature, for example, 200° F. At this relatively low temperature, the first reaction is flameless and there is a minimum of sintering of the first catalyst.

Another important feature of the invention is that the combustion efficiency of the second reaction is quite high, because the fuel-air mixture is pre-heated and is impelled against the catalyst with considerable velocity (although in certain applications there is an optimum velocity at which maximum combustion efficiency is obtained). Furthermore, a high concentration of fuel-air mixture per unit area of catalyst is obtained, resulting in a high power output per unit area of catalyst. This consideration is important, in view of the fact that catalysts of the type necessary in this type of heater are relatively expensive.

The second reaction may be substantially flameless if desired, or may be conducted at a sufficiently high temperature to produce a flame. The flameless reaction has certain advantages in small, portable heaters, while the flame reaction may be more efficient for certain fixed installations. In any event, the second reaction is carried out at a substantially higher temperature than the first reaction. In view of the fact that the first reaction is started with a minimum of difficulty, it is not serious if a certain amount of sintering of the second catalyst occurs, as long as some un-sintered catalyst remains in the path of the heated vapors from the fuel tube.

As as important feature of the invention, the cover is designed to fit fairly closely over the burner elements so that a minimum of air will be trapped within the cover when the device is closed. This is important for a number of reasons. In the event that the methanol is oxidized, one of the oxidation products is water. It is desirable to minimize the amount of reaction occuring after closing of the cover so as to minimize the trapping of water vapor within the device. Also, it is desirable to maintain the interior space of the cover as nearly saturated with methanol vapor as possible, so as to exclude as nearly as possible nitrogen, carbon monoxide, and other substances carried by air which tend to contaminate the catalyst. In addition, the presence of maximum methanol vapor within the cover results in reduction of the catalyst by reaction of the oxygen thereon with the methanol vapor, so as to place the catalyst in a ready state so that it becomes active immediately upon renewed contact with oxygen when the cover is removed. Furthermore, when the cover is tightly fitted in place, methanol vapor is deposited upon the catalyst so as to give a quick start when the cover is removed.

In view of the fact that the fuel-oxygen reaction continues for a short time after the cover is placed upon the device, thereby creating a partial vacuum, I find it advisable in certain instances to provide valve means or the like which are operative upon closing of the cover so as to block the flow of liquid fuel from the fuel reservoir to the fuel tube, so as to prevent fuel from flooding the device.

Another important advantage of the invention, in a number of embodiments thereof, is that the fuel tube is independently heated by the first catalytic reaction, making it unnecessary to conduct back any of the heat from the point of the second catalyst to the fuel tube.

It will be apparent that my heater may be used in devices so as to render them fully portable and independent of electric current. In addition, my improved heater requires no pumping of the fuel or of the air which is fed to it, and requires no match for starting. As a flameless or low flame heater, it may be safely used in the home, in automobiles, on picnics, etc.

My improved heater may be used as a stove, as a pressing iron, as a soldering iron, and with certain modifications as a cigarette lighter or blow torch. My improved heater has many other applications.

In one highly preferred embodiment of my invention, the device is adapted to be used as a cigarette lighter, having a number of desirable properties including quick starting, long life, starting solely by removing the cover with the resulting elimination of a flint, and elimination of the charring of the wick. With modifications, this embodiment is also suitable for other applications.

Said preferred embodiment employs several steps of cascade heating. In said preferred embodiment, I provide a fuel tube having a wick therein which is adapted to be immersed in liquid methanol and which has a small central, top opening. I coat the peripheral surface of this tube with a catalyst and I employ a further wick which is disposed in close proximity to this catalyst and which is also immersed in the liquid methanol.

Above the fuel tube, I support a platinum wire which is coated with a platinum sponge deposit. The lower end of this wire is connected to a special catalytic stick which extends radially with respect to the axis of the burner tube and which is preferably slightly off-set radially with respect to the axis of the burner tube. This catalytic stick consists of platinum black in an inert binder.

In operation, the fuel tube is heated as a result of the reaction of fuel vapor and oxygen at the catalytic deposit on the surface of said burner tube. As a result, the burner tube ejects a stream of methanol vapor. This vapor strikes the catalytic stick, which catalyzes a fuel-oxygen reaction at the outer end thereof. As a result, the catalytic stick is heated, and finally the inner end of the stick catalyzes a reaction at a still higher temperature. Accordingly, the platinum wire and the platinum sponge are heated and the platinum sponge catalyzes a reaction at a still higher temperature. Finally, the platinum wire is heated to a sufficiently high temperature so that it catalyzes a reaction wherein the fuel is ignited and produces a flame.

One important object of my invention is to develop an improved catalytic stick, as well as an improved arrangement of parts, so that these cascade reactions occur in rapid succession to produce a flame almost immediately after the cover is removed from the device. I have found that when the device has not been used for a period such as a day or more, it takes no more than two to three seconds for a flame to be produced after the cover is removed. Furthermore, if the cover is then replaced, so as to extinguish the flame, and if the device is used again in the same manner shortly thereafter, ignition occurs within a fraction of a second.

Other objects and advantages of this invention will become apparent from the following description in conjunction with the annexed drawings in which preferred embodiments are disclosed.

In the drawings, a first embodiment of my invention is shown in FIGS. 1 and 2. In this embodiment my heater is a portable stove.

FIG. 1 is a vertical section through the heater, the cover being shown partly in broken lines to indicate that the device is being operated with the cover removed.

FIG. 2 is a top plan view, partly broken away, of FIG. 1.

A second embodiment of the invention is shown in FIG. 3. In this embodiment, the heater serves as a soldering iron.

FIG. 3 is a vertical section through the device, with the cover being shown partly in broken lines to indicate that the device is being operated with the cover removed.

FIGS. 4 and 5 show a third embodiment of the invention, in which the heater serves as a pressing iron.

FIG. 4 is a vertical section, partly in elevation, of the device of this embodiment.

FIG. 5 is a section on line 5—5 of FIG. 4.

FIG. 6 is a vertical section of another embodiment of the invention, the cover being shown partly in broken lines to indicate that the device is being operated with the cover removed. In this embodiment, my heater serves as a cigarette lighter.

FIG. 7 is a side view of another embodiment of my invention, in which the device is adapted to function as a cigarette lighter.

FIG. 8 is a vertical section through the device, showing the cover closed.

FIG. 9 is a view similar to FIG. 8, showing the cover open.

FIG. 10 is a section on line 10—10 of FIG. 8.

FIG. 11 is a detail of FIG. 8.

FIRST EMBODIMENT
*(FIGS. 1 and 2)*

The heater in accordance with this embodiment includes a substantially cylindrical container 1 having an integral base 2. Container 1 also has a cylindrical lid 3 which rests upon the rim of container 1 and which has a depending cylindrical flange 3a which is frictionally insertable within the peripheral wall of container 1. Said lid 3 may be removed when it is desired to place more fuel within container 1.

Optionally, container 1 is filled with a stuffing or wadding 4 which may be made of cotton or the like. This stuffing 4 is preferably saturated with a fuel in liquid form. Preferably, I employ methanol as the fuel.

Lid 3 has a through-and-through opening, optionally in the center thereof, through which fuel outlet tube 5 is frictionally inserted. Said tube 5 optionally extends somewhat below lid 3 and preferably extends a selected distance above lid 3. Tube 5 is substantially cylindrical and is open at the bottom thereof. The axis of tube 5 is preferably substantially parallel to the axis of container 1 and is optionally axially coextensive therewith. Tube 5 is fixed sealingly within the aforesaid opening of lid 3 and may be secured therein by any suitable means.

Tube 5 has a dome-shaped top 6 which is optionally and preferably integral therewith and which closes off the top thereof. Said dome top 6 has a plurality of openings or orifices 7. In the preferred embodiment, said openings 7 are spaced evenly about the circumference of dome 6 and are radially spaced from the center point of dome 6, as is clearly shown in FIG. 2. Dome 6 is substantially part-spherical in shape. Each opening 7 is drilled with its axis normal to the surface of dome 6, so that jets of fuel vapor 17 (formed in a manner to be described below) are directed from tube 6 out of opening 7 in substantially radial directions.

The main fuel wick 8 is located in tube 5 and substantially fills the interior space thereof. Wick 8 extends below tube 5 for a substantial distance, as shown in FIG. 1, and is in intimate contact with the filling 4. As a result, wick 8 becomes saturated with the liquid methanol.

An annular plate 9 is fixed to fuel tube 5 by any suitable means, with each fuel tube 5 extending through the opening of plate 9. Fuel tube 5 and plate 9 are fitted together sufficiently tightly to provide good thermal conductivity. Plate 9 is located just below the dome top 6, and is spaced from the top face of lid 3. While plate 9 is shown as solid, it will be apparent that it may be perforated to permit heat to rise more freely therethrough. Most of the lower face of plate 9 is coated with a catalyst 10. In the preferred embodiment, the carrier for the catalyst 10 consists of small particles of aluminum oxide, said particles being coated with the catalyst itself, which consists of finely divided platinum black.

The auxiliary wick includes an annular pad 11 mounted upon lid 3 with tube 5 extending through the opening of said pad 11. Pad 11 is in substantially vertical registration with the catalyst 10. A plurality of wicks 12 extend into pad 11 and also extend through suitable openings in lid 3 and downwardly into intimate contact with stuffing 4. Accordingly, said pad 11 is saturated with the liquid fuel. Said wicks 12 are preferably evenly spaced around the circumference of pad 11 as shown in FIG. 2. Optionally, there are three such wicks 12.

A further circular plate 13, which is preferably of greater diameter than plate 9 but of less diameter than lid 3, is located above plate 9 and dome 6. Said plate 13 is supported by a plurality of circumferentially spaced hollow spacer sleeves 14, which are located adjacent the periphery of said plate 13. Said sleeves 14 are located radially outwardly of plate 9. The lower ends of said sleeves 14 rest upon the upper face of lid 3. Suitable securing screws 15 extend through plate 13 and through said sleeves 14, with the threaded lower ends of said screws 15 being engaged in suitable threaded holes within lid 3.

The lower face of plate 13 is coated with a further catalyst 16, which is optionally and preferably of a type similar to that of catalyst 10 and which is optionally disposed in an annular configuration. The annular catalyst is so disposed and of such an area so as to receive the jets of fuel vapor 17 emitted through the fuel holes 7 during operation of the heater.

Optionally, a spiral platinum wire 119a is fixed to the lower face of plate 13 under a portion of the catalyst 16 and directed toward one of the openings 7, so that the jet of vapor leaving that opening passes through the spiral before striking plate 13.

Cover 18 is substantially cylindrical and is closed at its upper end by the integral plate 19. The lower end of the peripheral wall of cover 18 rests upon lid 3 adjacent the outer periphery thereof. Cover 18 has a lower end extension 20 of increased diameter which fits frictionally over the outer periphery of container 1.

The operation of the heater in accordance with this embodiment is as follows: Initially, with the cover 18 mounted upon container 1, the interior space of cover 18 becomes substantially saturated with methanol vapor emitted primarily from the auxiliary wick pad 11 (very little vapor is emitted initially from tube 5). When the cover is removed, air is mixed with the methanol vapor. The methanol vapor emitted upwardly from wick pad 11, upon striking the catalyst 10, reacts with the intermixed oxygen to produce combustion. This is the starter reaction of the tube and is initiated solely by the removal of cover 18 and without the use of a match or other ignition means. This starter reaction occurs at a relatively low temperature, which is preferably 200° F. The starter reaction is flameless. The starter reaction is at a sufficiently low temperature so as to minimize sintering of the catalyst 10. As a result of the reaction of the methanol with the oxygen at the catalyst 10, plate 9 is heated. Fuel tube 5 is thereby heated. As a result of the heating of the fuel carried by wick 8, fuel vapor is ejected through openings 7 in vapor streams 17 of considerable velocity. Each vapor stream 17 scatters outwardly slightly from its source and strikes catalyst 16 over an area which is greater than the area of opening 7.

If the heater has been previously used for a considerable period of time, the portion of the catalyst 16 which is in the path of the vapor streams 17 is substantially sintered, as a result of the relatively high operating temperature of the reaction at plate 13, and as will become more fully apparent from the following description. However, immediately after the reaction at plate 9 begins, plate 9 is heated. A certain amount of heat from plate 9, as well as a certain amount of heat from the vapor streams 17 strikes catalyst 16 and heats plate 13 and catalyst 16. Optionally, a certain amount of catalyst 16 is disposed upon plate 13 outside the area at which the vapor streams 17 strike plate 13. This additional catalyst 16 is not sintered, or at least is not sintered to the same extent as the main catalyst. Accordingly, the various random vapors present immediately after removal of the cover strike this additional catalyst 16 and react thereat with air to produce additional heat for plate 13 and catalyst 16. In any event, from these two or three sources, catalyst 16 is heated to a temperature, at which despite the fact that it is sintered, it is able to catalyze a second fuel-air reaction. As a result of the heating of catalyst 16, the reaction at catalyst 16 is at a higher temperature than the reaction at catalyst 10. It will be apparent that when the cover is removed ample air may enter the device between lid 3 and plate 13 to provide the necessary oxygen for the reaction at catalyst 16.

The temperature of the reaction at plate 13 depends upon the type of catalyst employed, the extent of heating of the catalyst 16 and vapor stream 17, the spacing of plate 13 from dome 6, the amount of oxygen available and other factors which are matters of design. In the case of a small portable heater, I prefer to maintain the reaction at plate 13 at approximately 500° F., at which the reaction is substantially flameless. Optionally, the reaction temperature may be increased so that there is a small annular glow underneath the catalyst 16.

Very little heat is conducted back from plate 13 to tube 5. In fact, because of the reaction at catalyst 10, the heating of tube 5 is independent of the temperature and heat dissipation of plate 13. Therefore, as an example, if a large mass of cold water were suddenly to be poured upon plate 13, thereby drawing away a considerable portion of the heat thereof, the temperature of tube 5 would not be appreciably lowered and heated vapor streams 17 would continue to impinge upon the catalyst 16. Accordingly, the heating reaction at catalyst 16 would not cease.

While sintering of the catalyst 16 occurs, this is not serious, because the starter reaction at catalyst 10 will always pre-heat the tube 5, making available the necessary heat to initiate the reaction at catalyst 16.

Preferably, cover 18 fits relatively closely over the plates 9 and 13. When it is desired to stop the heating action, cover 18 is merely replaced upon container 1. The reactions within the enclosed spaces of cover 18 cease when any oxygen trapped therein is exhausted. As a result of the close fit of cover 18, a minimum of air is trapped within cover 18 when the device is closed. Therefore, a minimum of water vapor resulting from the combustion of the methanol is trapped within the device during non-use thereof. Also, since a minimum of air is trapped within closed cover 18, the enclosed space remains substantially saturated with methanol vapor. As a result, the presence of substances which might contaminate the catalysts is minimized.

When methanol and oxygen react completely, the end products are carbon dioxide and water. However, when the combustion is not complete, certain aldehydes are formed. These may have a disagreeable odor, but this is not serious in most portable uses of the device. The objection of the aldehydes is overbalanced by the fact that both reactions are flameless, and by the fact that no ignition means is necessary to start the reaction, it being merely necessary to remove the cover.

When the heater is made of larger size for fixed installations, it is preferable to raise the temperature of reaction at the catalyst 16, even though a small flame may be produced, because a higher temperature results in more complete combustion of the fuel.

In one actual working model of the invention, the outer diameter of container 1 was approximately 9.5 cm. The height of the container (from the base to the top of lid 3) was approximately 3.8 cm. The height of the entire unit with the cover on was approximately 6.7 cm. The diameter of plate 13 was approximately 7.6 cm. There were 16 jets 7, each approximately 0.15 mm. in diameter. The wicks were made of cotton. The catalyst was 10 percent by weight of platinum black deposited on an aluminum oxide carrier of grain size between 14 and 48 mesh. The remaining dimensions can be substantially determined from FIGS. 1 and 2, which are substantially to scale of said working model.

While catalyst 16 has been described as annular, it will be apparent that any other configuration may be used such as will result in most of the catalyst 16 being struck by the vapor streams 17 during operation of the device.

Other catalysts which may be used include (without limitation thereto) platinum in finely deposited metallic or sponge form, diatomaceous earth, and ceramics. Various combinations of these catalysts may be used. Other carriers, such as asbestos, may be used. Other carriers which may be used include (without limitation thereto) clay, asbestos and ceramics.

When the wire 119a is incorporated in the first embodiment, the operation thereof is modified to the extent indicated in the following description. Said spiral platinum wire 119a is employed to cause ignition of the fuel-air mixture. Wire 119a is heated by the reaction at catalyst 16 until it is itself sufficiently hot to catalyze a fuel-oxygen reaction. If the velocity of the vapor stream 17 passing through the center of wire 119a is properly adjusted, said wire 119a causes ignition of the fuel-air mixture, producing a flame. The additional resulting heating of plate 13 and catalyst 16 causes ignition of all of the fuel-air streams striking the catalyst 16. I have found that the flame at wire 119a is yellow, and the flame at catalyst 16 is blue-white.

If the upper end of the wire 119a is exposed, as would happen if plate 13 were omitted and wire 119a used as a probe, the flame at wire 119a can be extinguished if the exit velocity of the fuel-air mixture at the upper end of the wire exceeds the flame propagation velocity; and the position of the flame relative to the wire can be varied by varying the velocity with which the fuel-air mixture passes through the wire. The velocity of the fuel-air mixture at the wire may be varied by moving the wire and by any other suitable means.

In the actual embodiment of FIG. 1, it is preferable that the direct velocity of the fuel-air stream 17 through the wire 119a exceeds the flame propagation velocity. The stream 17 then rebounds from the roughened surface of catalyst 16 at a rebound velocity which is sufficiently low to maintain a flame at wire 119a and catalyst 16. This permits the vapors to strike catalyst 16 with maximum velocity and the flame remains seemingly affixed to the underside of plate 13.

Optionally, wire 119a can be made removable, because the flame-producing reaction at catalyst 16 would continue once it had been started. However, it is possible that a sudden draught or wind might blow the flame out, so that I prefer a maintain wire 119a permanently in place.

Optionally, when wire 119a is used, the number of jets 7 may be varied. Optionally, also, more than one wire 119a may be used. Optionally, also, the shape and position of wire 119a may be varied.

SECOND EMBODIMENT
(*FIG. 3*)

In this embodiment, the fuel container 31 is similar to fuel container 1, but is axially elongated. Container 31 contains a fuel-saturated wadding 32 similar to the wadding 4 of the first embodiment.

The container lid 33, which rests upon the rim of container 31, has a depending, internally threaded peripheral flange 34 which is adapted to be screwed on to the top portion of the peripheral wall of container 31, which is correspondingly threaded.

Lid 33 has a central upstanding bushing 35 which also extends somewhat below lid 33 and which has a through-and-through axial bore. Lid 33 also has an upstanding peripheral flange 36.

An annular wick pad 37 is disposed in the space between bushing 35 and flange 36 and rests upon the upper face of lid 33. The starter wick 38 is in intimate contact with the wick pad 37 and extends downwardly through a suitable opening in lid 33 into intimate contact with the wadding 32, so that wick pad 37 is saturated with the liquid fuel similar to wick pad 11 of the first embodiment.

The fuel tube 39 extends frictionally into the axial opening of bushing 35 and protrudes above the upper face thereof. Tube 39 may be fixed in place in bushing 35 by any suitable means. Tube 39 is substantially cylindrical in shape and has a preferably integral, flat top closure plate 40 with a central opening 41. Wick 42 extends through the hollow tube 39 and also extends downwardly into intimate contact with the wadding 32. Wick 42 is saturated with the liquid fuel similarly to wick 8 of the first embodiment, and fuel vapor leaves tube 39 through the outlet hole 41 in a fuel jet 43, similar to the first embodiment.

Annular plate 44, corresponding to plate 9 of the first embodiment, if fixed to tube 39 at approximately the mid-point thereof with said tube 39 extending through the central opening of said plate 44. Plate 44 is located slightly above the common upper level of bushing 35 and flange 36. The lower face of plate 44 is coated with a catalyst 45 corresponding to catalyst 10 of the first embodiment.

The secondary reaction takes place in a relatively long tube 46. This tube 46 is of greater diameter than tube 39, is located just above plate 44 and is axially alined with tube 39. Tube 39 protrudes into the lower end portion of tube 46. The upper end portion of tube 39 extends frictionally into the central opening of an annular spacer 47, and the outer peripheral face of said spacer 47 extends frictionally into the bore of tube 46. Said spacer 47 is preferably made of a substantially rigid, heat-insulating material, such as Bakelite. Tube 46 is further supported by an annular mounting plate 49 which has a central, upstanding, cylindrical flange 50 through which the lower end of tube 46 frictionally extends. Tube 46 may be fixed to flange 50 by any suitable means. Plate 49 is located just above plate 44. Plate 49 rests upon a plurality of spacer sleeves 51 which extend through suitable openings in plate 44 and which rest upon the upper face of flange 36. Screws 52 respectively, extend through suitable openings in plate 49 and through the respective sleeves 51, with the lower threaded end portions of said screws 52 being engaged in suitably threaded openings in flange 36.

A soldering iron tip 53, which is preferably made of copper, is supported within the upper end portion of tube 46 and protrudes out of the upper end of said tube 46. The upper end of said tip 53 has the usual soldering faces 54. The main portion of the tip 53 is substantially cylindrical. A plurality of circumferentially and vertically spaced supporting screws 55 extend radially inwardly through suitable openings in the wall of tube 46 and are suitably engaged within the main portion of tip 53, in order to hold said tip 53 in axial alinement with and spaced from the wall 46.

The lower end portion 56 of tip 53 is tapered and is coated over its entire periphery with a catalyst 57 which is similar to catalyst 16.

Tube 46 has a plurality of vertically and circumferentially spaced air holes 58 above the level of tube outlet opening 41, so as to insure the proper fuel-air mixture within tube 46.

The external diameter of flange 36 is slightly less than the external diameter of flange 34, so as to provide an annular shoulder 59. The cover 60 is substantially cylindrical in shape and has a top closure 61. Said cover 60 may be releasably placed upon the device with cover 60 fitting frictionally over the outer face of flange 36, and with the lower face of cover 60 resting upon shoulder 59. The cover top 61 is then spaced slightly above the upper end of the soldering iron tip 53.

The operation of this embodiment is similar to the operation of the first embodiment. When the cover is removed, there is an immediate low temperature reaction of fuel and air at plate 44, which heats tube 39. As a result, the fuel vapor stream 43 is directed upon the catalyst 57, at which point the secondary, high temperature reaction of the fuel and oxygen takes place. This causes the heating of the soldering iron tip 53 to a temperature sufficient for normal soldering purposes.

Optionally, in this embodiment, the tip 53 may be replaced by any other type of tip or the like which must be kept heated during use.

Optionally, also, tip 53 may be eliminated and the catalyst 57 may be applied to the inner face of tube 46. The air passing out of the upper end of the tube is then heated as a result of the reaction at catalyst 57. Also, the moving fuel vapor stream causes the tube to act as a Venturi tube drawing in a substantial amount of air through holes 58. Accordingly, the device acts as a hot air blower. Optionally, also, when tip 53 is eliminated and catalyst 57 is applied to the inner face of tube 46, a wire similar to wire 119a may be placed in the end of tube 46. The device then acts as a blow torch.

THIRD EMBODIMENT

(FIGS. 4 and 5)

The pressing iron in accordance with this embodiment has a flat base plate 71. This base 71 has an upstanding circumferential flange 72 located slightly inwardly of the outer peripheral edge of said base 71. The casing has a top wall 73, front wall 74 and side walls 75. The side walls 75 and the front wall 74 rest upon base 71 outwardly of and in frictional engagement with flange 72.

Flange 72 is open at the rear end of the device. Mounting plate 76 seals off the rear end of the casing. This vertical plate 76 has a horizontal forwardly extending flange 77 which rests frictionally upon plate 71 and which fits frictionally between the side portions of flange 72. The upper end of said mounting plate 76 frictionally abuts the rear edge of top wall 73. Plate 76 has a forwardly extending flange 78, which frictionally abuts the lower face of wall 73. The construction of mounting plate 76 may be varied and said plate 76 may be secured in place by any suitable means. It will be apparent that the parts so far described define the casing with a hollow interior space and which is substantially closed, except for the openings to be described below.

Fuel tank 79 is mounted upon the rear face of plate 76 by any suitable means. Said fuel tank 79 is filled with wadding 80 which is similar to wadding 4 of the first embodiment. The upper end of tank 79 has an opening which is closed by the removable plug 81, said plug 81 being adapted to be removed when it is necessary to pour more fuel into the tank 79. The front wall 82 of tank 79 is fixed to the rear face of plate 76 by any suitable means. Plate 76 and wall 82 have coaxial openings, the opening in plate 76 being of slightly greater diameter. The horizontal fuel tube 83 is located within the casing and extends clearingly through the opening in plate 76 and frictionally into the opening in wall 82. Tube 83 extends most of the length of the casing and may be supported in its horizontal position relative to plate 71 by any suitable means, preferably of a heat-insulating type (not shown).

Further horizontal tubes 84 are located on either side of and spaced from tube 83, the axes of all three tubes being parallel. Said tubes 84 are supported in position by any suitable means (not shown). Said tubes 84 extend clearingly through the opening of plate 76 and frictionally through suitable openings in wall 82 (not shown). The tubes 84 are respectively packed with wicks 85 which correspond to the wick arrangement 11, 12 of FIG. 1. These wicks 85 extend through the tubes 84 and rearwardly thereof into intimate contact with the wadding 80 (this detail being omitted from the drawings). Tube 83 is filled with a further wick 86 which corresponds to wick 8 of the first embodiment, and said wick 86 extends rearwardly into tank 79 and into intimate contact with the wadding 80. The portions of the tube 84 which are proximate to tube 83 have a plurality of longitudinally spaced ports 87, extending along most of the length of these tubes. Opposite the ports 87, the respective side portions of tube 83 are coated with respective catalysts 88 which correspond to the catalyst 10 of the first embodiment.

Tube 83 has two rows of longitudinally spaced outlet jets 89 in the lower portion thereof, through which fuel vapor streams 90 are adapted to be directed radially, downwardly and outwardly. The upper face of plate 71 is coated with two laterally spaced, longitudinally extending layers of catalyst 91 corresponding to the catalyst 16 of the first embodiment, and upon which the fuel jets 90 respectively impinge.

The upper wall 73 has a plurality of laterally extending, longitudinally spaced air inlet ports 92 at the front end portion thereof. Cover plate 93 is supported on the upper face of wall 73, by means of brackets 94 (not shown in detail), so as to be longitudinally slidable. Said plate 93 has a plurality of laterally extending, longitudinally spaced ports 94. In the closure position of plate 93 the ports 95 are completely out of registration with the port 92, so that no air can enter the interior space of the casing. FIG. 3 shows the ports 95 in partial registration with the ports 92, so as to permit the entry of air into the casing. It will be apparent that the amount of air entering the casing may be controlled by regulating the position of plate 93 relative to top wall 73.

The horizontal lifting handle 96 has a depending rear portion 97 which is fixed to the upper rear portion of the upper face 73.

The operation of this embodiment is similar to the operation of the first embodiment. When cover 93 is open, the fuel vapor leaving the tubes 84 through the ports 87 is intermixed with air and reacts therewith at the catalytic surfaces 88. As a result, tube 83 is heated and fuel vapor jet streams 90 are directed out of the ports 89 and against the catalytic surfaces 91. The secondary reaction occurs at these surfaces and heats the sole plate 71. It will be apparent that the temperature of the sole plate may be varied by varying the extent of registration of the ports 95 and the ports 92.

FOURTH EMBODIMENT

(FIG. 6)

In this embodiment, my improved heater produces an open flame and may serve as a cigarette lighter or the like.

The fuel container 101 is generally cylindrical in shape, has a bottom closure 102 and is elongated in the direction of its axis. Fuel container 101 has an upper cylindrical extension 103 of slightly reduced diameter to provide an annular shoulder 104 at the junction between the main container and the container extension. Said container extension 103 has a plurality of longitudinally and circumferentially spaced air holes 105. The fuel tube 106 is positioned within container 101 in such a way as to be substantially coaxial therewith. Fuel tube 106 is generally cylindrical in shape, and a portion of the lower peripheral wall is cut away at 107 so as in effect to provide an enlarged bottom opening for the tube. Above the cut-away portion 107, tube 106 extends frictionally through the central opening of an annular insulating washer 108, said washer 108 being secured to the peripheral wall of container 101 by any suitable means (not shown).

Below the washer 108, container 101 is filled with a fuel-saturated wadding 109 which corresponds to the wadding 4 of the first embodiment. Tube 106 is filled with a wick 110 which corresponds to the wick 8 of the first embodiment, and which extends out of the bottom opening of the tube into intimate contact with the wadding 109. An additional, substantially cylindrical wick 111, which corresponds to the wicks 11, 12 of the first embodiment, is located in tube 101. This wick 111 is positioned adjacent the peripheral wall of container 101, and extends above washer 108, through a suitable opening in washer 108 and below washer 108 into intimate contact with the wad 109.

Above washer 108, the outer face of tube 106 has a cylindrical catalytic coating 112 which corresponds to the coating 10 of FIG. 1 and which is positioned opposite the wick 111.

Above the catalytic coating 112, the tube 106 is shaped to provide a generally upstanding rear wall 113 and a front wall 114. This wall 114 slopes upwardly and rearwardly from the front of tube 106 and then meets a wall portion 115 which abuts the rear wall 113. The top of wall 113 is optionally flanged over at 116 to grip the top of wall 115. Wall 114 has a tube outlet port 117, through which a fuel vapor jet may flow out of tube 106 in a direction substantially parallel to the axis of tube 106.

The front face of wall 115 is coated with a catalyst 118 which corresponds to the catalyst 16 of the first embodiment. In addition, a length of very fine platinum wire 119, wound in a spiral, is fixed to the front face of wall 115 so that the axis of the spiral is substantially alined with the axis of port 117, and so that the spiral 119 and the catalyst 118 are longitudinally substantially coextensive.

The cover 120 is cylindrical in shape and fits frictionally over the container extension 103 with the lower edge of cover 120 substantially abutting the shoulder 104. The cover 120 has a top closure 121. The operation of this embodiment is as follows:

When cover 120 is removed, fuel vapor emitted by wick 111 reacts with oxygen at the catalytic surface 112 thereby heating tube 106. A steady stream of heated fuel vapor is thereby emitted through outlet port 117. The heated fuel vapor reacts with air at the catalytic surface 118, thereby heating the platinum wire 119. As a result, the platinum wire 119 serves as a catalyst to maintain a reaction between the fuel stream and the air. The temperature of this last-mentioned reaction is sufficiently high so as to ignite the fuel vapor and produce a flame 122.

As stated in the discussion of wire 119a (first embodiment), the position of flame 122 relative to wire 119 depends upon the velocity of the vapor stream emitted through jet 117, and in fact the flame may even be extinguished if the vapor stream has sufficient velocity.

As a further consideration, some of the heat from plate 115 is conducted back to fuel tube 106 to aid in heating same. As a result, there may be a gradual increase in heat output of the device as the tube 106 is first heated by the reaction at catalyst 112 alone and is then heated by feedback from the reaction at catalyst 118, so that the temperature and velocity of the fuel vapor stream increases until wire 119 is heated sufficiently for ignition. The addition of heat feedback results in faster heating of the burner tube and hence in quicker ignition than is possible in the first embodiment.

FIFTH EMBODIMENT

(*FIGS. 7–11*)

A practical embodiment of a quick-starting cigarette lighter or the like is shown in FIGS. 7–11.

In this embodiment, I provide a generally rectangular, hollow casing 200, having a top wall 201. This casing is adapted to be filled with liquid fuel 202, preferably methanol, through any suitable fill opening (not shown). Wall 201 has a preferably circular opening and has a cylindrical bearing flange 203 or the like depending therefrom and extending around said opening. Sleeve 204 extends frictionally slidably through the bore of flange 203 and also etxends above wall 201.

A hollow tube 205 is fixed within the bore of sleeve 204. This tube 205 is optionally made of glass. The top of tube 205 is optionally flush with the top of sleeve 204, and tube 205 preferably extends below sleeve 204 to a point near the bottom of casing 200. A bracket 206 is fixed to the inner wall of casing 200 and supports a horizontal sealing pad 207 below and in substantial vertical registration with the lower end of tube 205. Said pad 207 is of greater area than the area of the lower end opening of tube 205, so that pad 207 is adapted to seal said lower end opening of tube 205 when tube 205 is lowered. Pad 205 is preferably made of a resilient material having sealing properties, such as rubber.

An upstanding bracket 208 is fixed to wall 201 near the front end thereof, by any suitable means. A horizontal arm 209 is fixed to bracket 208 by any suitable means and extends rearwardly therefrom. Arm 209 is spaced above wall 201. At its rear end, arm 209 terminates in a collar 210 whose axis extends vertically and is alined with the axis of tube 205.

Sleeve 238 is fixed within collar 210. Sleeve 238 has a transverse bottom flange 239 which extends under the lower edge of collar 210, and which also extends inwardly of sleeve 238. Metal fuel outlet tube 211 is fixed within the bore of collar 210 and extends upwardly therefrom. Preferably, the lower end of tube 211 abuts the upper face of flange 239. The lower end of tube 211 is preferably open, and the upper end thereof is preferably closed, except for port 212. A tubular wick 213 is fixed to the inner peripheral face of tube 211 and preferably extends the entire length thereof, and also to the lower face of flange 239. This wick 213 is preferably made of asbestos, but may optionally be made of a blotter-like material or may be in the form of an absorbent coating on said inner peripheral face of tube 211. The absorbent coating may optionally be diatomaceous earth with a binder of sodium silicate.

Sleeve 238 and flange 239 are preferably made of an insulating material which may be rubber, plastic, cork or the like, or may be a layer of silicate cement or the like. Sleeve 238 provides heat insulation between tube 211 and holder 209.

In this embodiment, I also provide a wick element 214 which is optionally and preferably relatively rigid so that it may be inserted within tube 205. This wick element 214 is preferably of annular shape and has a depending cylindrical flange 215 extending around its central opening. This flange 215 is fixed frictionally within the top of the bore of tube 205, with wick element 215 preferably resting upon the top of tube 205. The inside diameter of the upper portion of wick element 214 is of greater diameter than collar 210 and has a plurality of upstanding wick extensions 216. There are optionally three such wick extensions 216, which are equally spaced around the circumference of wick element 214. The inner faces of these wick extensions 216 are radially spaced from tube 211.

The wick element 214 is preferably made of a porous ceramic material. Optionally, it may be made of asbestos or a blotter-like material, with appropriate mechanical reinforcement if necessary.

The outer peripheral face of tube 211 is provided with a catalytic coating 217. Said catalytic coating 217 is optionally similar to the catalytic coatings of the first embodiment.

The remaining interior space of tube 205 is substantially filled with a wick 218, which is optionally and preferably made of cotton. This wick 218 also extends upwardly through the openings of flange 215 and element 214, and terminates at its upper end in a wick pad 219 of enlarged diameter which rests upon the upper face of element 214. When sleeve 214 is raised, so as to break the seal between pad 207 and tube 205, pad 219 is adapted to abut the insulating flange 239 and hence to seal the lower end of tube 211, and in particular to make such contact with wick 213 as to permit fuel transfer between the wicks. Flange 239 helps to insulate the heat of the metal parts from wick pad 219, which heat might cause fuel vaporization outside tube 211.

An additional bracket is fixed to the upper end of bracket 208, by any suitable means, and includes a vertical bracket arm 220 which is radially offset relative to the axis of tube 211. A hollow, horizontal holder tube 221 is fixed to the rear face of bracket arm 220. This holder tube 221 is preferably made of metal and is positioned above the top of tube 211 and preferably extends rearwardly from bracket arm 220 in a radial direction relative to the axis of tube 211. I provide a substantially cylindrical catalytic stick 222 which has its front end portion embedded in the bore of tube 221 by any suitable means. Accordingly, stick 222 extends substantially radially with respect to the axis of tube 211. The front end of stick 222 is preferably radially remote from port 212, and the rear end of stick 222 is preferably spaced very slightly radially in front of port 212. Optionally, the front end of stick 222 may be cemented directly to bracket 220.

I provide a further catalyst in the form of a platinum wire 224 having a catalytic coating 225. Optionally and preferably, wire 224 is in the form of a spiral, with its lower end embedded in a recess in the rear end of stick 222, and with its upper end connected to bracket arm 220 by any suitable means. Optionally and preferably, the axis of the spiral is alined with the axis of tube 211 and with port 212.

Optionally and preferably, I provide a windshield 226. This windshield 226 is optionally and preferably in the form of an upstanding wall which extends from one side edge of bracket 208 around the various elements previously described and located above wall 201 and hence back to the other side edge of bracket 208. Windshield 226 is fixed to bracket 208 by any suitable means, and preferably extends from the top wall 201 to a point slightly above wire 224. Windshield 226 has a plurality of holes 227. Of course, a guard or screen (not shown) may optionally be placed over the top of windshield 226, to protect the parts within the interior space thereof, while still permitting access to the flame.

Cover 228 is of hollow, generally rectangular shape and is open at its bottom. Cover 228 is connected to the rear of wall 201 by means of hinge 229. When closed, the periphery of cover 228 rests upon the periphery of wall 201, as shown in FIG. 8. Any suitable means may be provided for holding cover 228 closed, such as the cooperating latch members 230 on the cover and 231 on casing 200, shown in FIG. 7.

A flat blade spring 232 is connected at its rear end to the top of wall 201, by any suitable means. The front end portion of spring 232 is provided with a circular opening, the rim of which is located in a circumferential groove 233 of sleeve 204, said spring opening being of less diameter than the diameter of the main portion of sleeve 204. Spring 232 urges sleeve 204 upwardly into a normal position in which pad 219 makes contact with wick 213 and tube 205 is spaced from pad 207.

A cross rod 234 is fixedly connected between the side walls of cover 228 near the bottom thereof. When cover 228 is closed (FIG. 8), rod 234 depresses spring 232, so as to lower sleeve 204 into a position in which tube 205 makes sealing contact with pad 207 and pad 219 is spaced from wick 213.

THE CATALYTIC ELEMENTS

The active ingredient of catalytic stick 222 is platinum black, a finely divided, powdery form of platinum. While platinum black in its pure form is an excellent catalyst of a methanol-oxygen reaction, and produces fuel ignition, the resulting heating of the particles tends to cause them to melt and form a globular, dense structure known as platinum sponge (this effect being known as sintering). The platinum sponge is less active as a catalyst than the platinum black. I provide an improved relationship between the platinum black and its binder which tends to hold the individual particles of platinum black separate from each other, to minimize the formation of a globular structure.

I use as the binder a commercial preparation of ortho-ethyl silicate, which is first hydrolyzed. For example, I can use tetra-ethyl orthosilicate furnished by Carbide and Carbon Chemicals Co., New York, N.Y., and hydrolyze this compound with hydrochloric acid, water and alcohol pursuant to directions furnished by this company, in a publication entitled "Ethyl Silicate."

In one preferred method, I place a quantity of platinum black and a quantity of tetra-ethyl orthosilicate in an open-ended glass tube. I place one end of the tube against an absorbent, such as a blotter, and insert a plunger in the other end of the tube and tamp the material. Excess liquid is absorbed by the blotter. The tamped stick is then ejected from the tube and permitted to dry for several hours. All of these steps are carried out in an inert atmosphere consisting of carbon dioxide, nitrogen or the like.

OPERATION OF THE FIFTH EMBODIMENT

Initially, with cover 228 closed, the interior space of the cover becomes substantially saturated with methanol vapor omitted primarily from wick pad 219 and the wick arms 216. When the cover is opened, additional fuel can feed into wick 218 and hence to the wick arms 216, and also through wick pad 219 to wick 213. Also, air is mixed with the methanol vapor already present. The methanol vapor emitted from the wick arms 216, upon striking the catalyst 217, reacts with the intermixed oxygen to produce combustion. This is the starter reaction of the device and is initiated solely by the opening of cover 228 and without the use of a match or other ignition means. This starter reaction occurs at a relatively low temperature which is preferably approximately 200° F. The starter reaction is flameless. The starter reaction is at a sufficiently low temperature so as to minimize sintering of catalyst 217. As a result of the reaction of the methanol with the oxygen at the catalyst 217, fuel tube 211 is heated. As a result, the fuel contained in wick 213 is heated and vaporized and ejected through opening 212 in a vapor stream of considerable velocity. This vapor stream scatters outwardly from its source and is adapted to strike stick 222 over substantially its entire length, as well as the wire 225.

As will be apparent from the following description, the outer portion of stick 222 (adjacent tube 221) is substantially unsintered, and in fact this portion of stick 222 is substantially black in color. As will also become apparent below, the inner end portion of stick 222 (adjacent wire 224) becomes somewhat sintered if the device has been in use over a considerable period of time, and in fact after considerable use this inner end portion of stick 222 is substantially grey in color. The intermediate portion of stick 222 is sintered to an intermediate degree between the outer and inner end portions of the stick.

Stick 222 is initially heated by the reaction of the random fuel vapor initially present with oxygen, by the heat of the vapor stream striking same, and by the heat emitted by tube 211. However, in the instant after the reaction at catalyst 217 begins, stick 222 becomes at most only a few degrees hotter than catalyst 217.

When the fuel vapor stream strikes the outer portion of stick 222, together with the air which has been admitted after opening of the cover, said outer end portion of stick 222 catalyzes a reaction between the oxygen of the air and the fuel vapor (because of the partial sintering, the remaining portion of stick 222 cannot immediately catalyze said reaction). The reaction at the outer portion of stick 222 may be at a temperature of approximately 200° F., or optionally at a slightly greater temperature.

As a result of the reaction at the outer portion of stick 222, the stick is heated. As the inner portions of stick 222 are progressively heated, they become successively able to catalyze fuel-oxygen reactions at progressively higher temperatures. The inner portion of stick 222 is heated to a higher temperature than the outer portion of stick 222, because the relatively massive metal tube 221 conducts heat away from the outer portion of stick 222.

In effect, stick 222 acts as a cascade catalytic element, with the fuel-oxygen reaction cascading along the surface of stick 222, starting at the outer end thereof, and working toward the inner end thereof. The outer end of stick 222, which is substantially unsintered, can initiate the reaction without heating, thereby supplying the heat necessary to elevate the temperature of the inner end portion of stick 222 to the point at which it can act as a catalyst.

While fuel vapors initially strike the catalytic coating 225 of wire 224, this element is not as active a catalyst as the platinum black of stick 222 and accordingly does not initially act as a catalyst. However, as a result of the reaction at stick 222, the head 236 is heated to a sufficiently high temperature so that it is able to catalyze a reaction between the fuel vapor and oxygen at a temperature substantially in excess of 200° F. Finally, wire 224 and coating 225 are heated to a temperature substantially in excess of 500° F., so that they act as catalysts of the fuel-oxygen reaction, said reaction at the surface of coating 225 being at a sufficiently high temperature to produce ignition and a resulting flame 235 (FIG. 9).

I have found that this cascading of reactions is extremely rapid, so that even if the device has not been used for many hours or longer, the flame 235 is produced within approximately 3 seconds after cover 228 is opened. If the cover 228 is then closed, extinguishing the flame, and then opened after a relatively short period of time, a new flame is produced within less than one second.

When cover 228 is closed, the fuel supply into wick 218 is cut off, and also wick 213 is spaced from wick pad 219. As a result, even though the reaction may continue for a fraction of a second thereby creating a partial vacuum within cover 228, liquid is not drawn out of wick 218, and contamination of the catalyst is prevented.

The provision of the tubular wick 213 causes quick starts since less wick mass has to be heated to vaporize the fuel. The metal bracket 209 serves as a means of dissipiation of excess heat. The elements are proportioned so that almost immediately when the reaction at catalyst 217 is initiated, vapor begins to be given off by the wick 213, but not in sufficient amount to dry out the wick. It is important that an even flow of vapor be obtained to prevent sputtering of flame 235.

Optionally, in order to increase the glow of flame 235, I incorporate thorium or cesium in the solution in which wire 224 is dipped to form the coating 225. In the alternative, I can employ a second wire spiral wound around the first spiral, said second spiral being coated with thorium or the like.

I have found that the perforated windshield 226 is extremely useful and results in a larger flame with corresponding conservation of fuel. Said windshield 226 tends to confine the vapors around the catalytic elements, tends to retain the heat given off as a result of the reactions and serves to provide an efficient flow of air from outside the device over the catalytic elements.

It will be apparent that the device of this embodiment is highly useful as a cigarette lighter or as a portable signal torch.

This embodiment is a preferred embodiment, because I have found that the outer portion of stick 222 does not become sintered during use of the device, as a result of which the device can last indefinitely.

It is impossible to incorporate certain of the features of this embodiment in some of my previously described embodiments. For example, the catalytic coatings of my earlier embodiments may optionally be deposited in the same manner as the catalytic coating 217. Furthermore, in an embodiment such as that of FIG. 1, the wire spiral 119a may be coated in the same manner as the wire 224, and stick 222 may also be incorporated in the embodiment of FIG. 1. Furthermore, the valve arrangement of the fifth embodiment for cutting off the fuel supply when the cover is closed may also be incorporated in the earlier embodiments.

Broadly speaking, stick 222 may be considered as a mass having particles of catalytic material evenly dispersed therethrough, said mass being connected at one section thereof to a heat-dissipating element, so as to establish a temperature gradient along said stick when it is heated, with resulting minimum sintering of the cooler portion of the stick, as explained above. Accordingly, I am not limited to the exact arrangement of stick 222 and the heat-dissipating elements 221 and 220, shown in the drawing. For example, stick 222 may be cylindrical with a metal rod extending axially therethrough, with the result that the outer portion of the stick is hotter than the center portion thereof.

As an alternative to the use of stick 222 and head 236, it is within the scope of my invention to replace the coating 225 on the lower portion of wire 224 with a further coating of a composition similar to that of stick 222. This further coating is cooler at its center portion (at wire 224) than at its outer portion and accordingly acts in the same manner as stick 222, as described in the preceding paragraph.

While I show bracket 220 as fixed in position, it will be apparent that bracket 220 may be movably coupled to cover 228 so as to maintain stick 222 and wire 224 in the igniting position of FIG. 9 when cover 228 is open and so as to move these elements 222 and 224 out of proximity to fuel tube 211 when the cover is closed.

In certain instances, it is possible to eliminate the use of the valve arrangement of the fifth embodiment. For example, in the first embodiment, wicks 4, 8 and 12 may be capillary wicks, with wick 4 of greater porosity than wicks 8 and 12. Accordingly, when the cover is closed, excess fuel drains from tube 5 and wick 11 into the fuel storage chamber. Similarly, for example, in the fifth embodiment, the wicks may be capillary wicks and a capillary wick of greater porosity may be employed within the casing 200 to hold the fuel 202.

While I have disclosed preferred embodiments of my invention, it will be apparent that various other changes, omissions and additions may be made in the invention without departing from the scope and spirit thereof.

In some instances, it is desirable to eliminate the wick which supplies fuel vapor to the catalyst for heating the fuel tube. Thus, in FIGS. 7–11, wick element 214 may be eliminated. In its place, means may be provided which are adapted to be actuated by opening the cover, or other suitable means, to supply a momentary fuel-air jet to catalyst 217, in order to initiate the cascade reactions. Once the reactions start, tube 211 is maintained heated by the heat of flame 235. If necessary, heat feedback may be provided, as in FIG. 6.

I claim:

1. A combustion device comprising a frame, an upright tube supported by said frame and having a top opening, a wick located within said tube, means for supplying liquid fuel to said wick, a catalytic coating on the outside of said tube, a further wick opposite said catalytic coating, means for supplying liquid fuel to said further wick, a catalytic stick mounted on said frame above said tube opening and extending radially with respect to the axis of said tube, means for dissipating heat from the outer end of said stick, an upright platinum wire, a platinum sponge coating on said wire, means connecting the lower end of said wire in axial alinement with said tube, and a cover for said device for excluding air therefrom when said cover is closed.

2. A catalytic device comprising a mass of colloidal particles of platinum black having a binder of silica in film form, a mass of heat-dissipating material connected to one portion of said mass of colloidal particles, a platinum wire connected to another portion of said mass of colloidal particles, and a platinum sponge coating for said wire.

3. A combustion device comprising a frame, an upright tube supported by said frame and having a top opening, a wick located within said tube, means for supplying liquid fuel to said wick, a catalyst for said liquid fuel and the oxygen of the air, means disposing said catalyst adjacent said tube, a further wick terminating at a point proximate to said catalyst, whereby said catalyst is adapted to catalyse a first reaction between the fuel vapors from said further wick and the oxygen of the air to heat said fuel tube and eject heated fuel vapor out of said opening, a heat-conducting support fixed to said frame, a stick of colloidal particles of platinum black having a binder of silica in film form, said stick being fixed at one portion thereof to said support and being positioned and adapted to be heated by the heat of said tube and of said fuel vapors and of said first reaction, said stick being adapted to catalyse a second fuel-oxygen reaction at higher temperature than said first reaction, a length of platinum wire connected to another portion of said stick and positioned and adapted to be heated by the heat of the first and second reactions and of said fuel tube and of said fuel vapors, said wire having a coating of platinum sponge, said coating and said wire being respectively adapted to catalyse successive third and fourth fuel-oxygen reactions at successively higher temperatures than the second reaction, and a cover for said device for excluding air therefrom when said cover is closed.

4. In a combustion device, a casing, a source for vaporizable liquid fuel located within said casing and comprising means adapted for receiving vaporizable liquid fuel, and receiving means having a fuel outlet tube, said outlet tube having a fuel vapor outlet opening, said fuel-receiving means also having an auxiliary fuel vapor outlet opening, said source having wick means for feeding fuel to said tube and also to said auxiliary fuel vapor outlet opening, a pre-heater catalyst for combustion of the fuel located within said casing and positioned for exposure to fuel vapor derived from said source through said auxiliary outlet opening, said pre-heater catalyst being further positioned relative to said tube for heating the fuel therein by combustion of fuel at said pre-heater catalyst so as to expel heated fuel vapor under pressure through said tube opening, a main catalyst for combustion of the fuel located within said casing and positioned for exposure to fuel vapor from said tube opening and also for reception of heat resulting from combustion at said pre-heater catalyst, separate heat conducting supports for each of said catalysts and arranged in cascade along common axis and means for admitting and excluding the flow of air into said casing at will, said catalysts sharing a common atmosphere of the fuel vapors and of the air admitted to said casing.

5. In a combustion device, a casing, a source for vaporizable liquid fuel located within said casing and comprising means adapted for receiving vaporizable liquid fuel, said receiving means having a fuel outlet tube, said outlet tube having a fuel vapor outlet opening, said fuel-receiving means also having an auxiliary fuel vapor outlet opening, said source having wick means for feeding fuel to said tube and also to said auxiliary fuel vapor outlet opening, a pre-heater catalyst for combustion of the fuel located within said casing, said pre-heater catalyst being in the form of a coating on the outer peripheral surface of said tube and being positioned for exposure to fuel vapor derived from said source through said auxiliary outlet opening, said pre-heater catalyst being further positioned relative to said tube for heating the fuel therein by combustion of fuel at said pre-heater catalyst so as to expel heated fuel vapor under pressure through said opening, a spiral axially alined with said tube and positioned opposite said tube opening, a main catalyst for combustion of the fuel located within said casing, said main catalyst being carried by said spiral and being positioned for exposure to fuel vapor from said tube opening and also for reception of heat resulting from combustion at said pre-heater catalyst, and means for admitting and excluding the flow of air into said casing at will, said catalysts sharing a common atmosphere of the fuel vapors and of the air admitted to said casing.

References Cited in the file of this patent

UNITED STATES PATENTS

| | | |
|---|---|---|
| 657,004 | Pierron | Aug. 28, 1900 |
| 1,050,536 | Heller | Jan. 14, 1913 |
| 1,326,767 | Moore | Dec. 30, 1919 |
| 1,353,314 | Chapman | Sept. 21, 1920 |
| 1,577,188 | Patrick | Mar. 16, 1926 |
| 1,906,335 | Rathburn | May 2, 1933 |
| 2,014,014 | Berthold | Sept. 10, 1935 |
| 2,036,885 | Richards | Apr. 7, 1936 |
| 2,291,657 | Schmitt | Aug. 4, 1942 |
| 2,419,272 | Marisic et al. | Apr. 22, 1947 |
| 2,487,065 | Milliken | Nov. 8, 1949 |
| 2,617,774 | Rottig et al. | Nov. 11, 1952 |
| 2,701,459 | Williams | Feb. 8, 1955 |

FOREIGN PATENTS

| | | |
|---|---|---|
| 4,452 | Great Britain | Nov. 26, 1877 |
| 3,984 | Great Britain | Feb. 16, 1914 |